United States Patent
Zhang et al.

(10) Patent No.: US 9,717,057 B2
(45) Date of Patent: Jul. 25, 2017

(54) UPLINK CONGESTION CONTROL

(75) Inventors: Zhang Zhang, Beijing (CN); Xinyu Gu, Beijing (CN); Torbjörn Wigren, Uppsala (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/356,107

(22) PCT Filed: Nov. 21, 2011

(86) PCT No.: PCT/CN2011/082536
§ 371 (c)(1),
(2), (4) Date: May 2, 2014

(87) PCT Pub. No.: WO2013/063832
PCT Pub. Date: May 10, 2013

(65) Prior Publication Data
US 2014/0286161 A1    Sep. 25, 2014

Related U.S. Application Data

(60) Provisional application No. 61/555,669, filed on Nov. 4, 2011.

(51) Int. Cl.
*H04W 52/14* (2009.01)
*H04W 52/24* (2009.01)
(Continued)

(52) U.S. Cl.
CPC ....... *H04W 52/24* (2013.01); *H04W 28/0236* (2013.01); *H04W 28/0284* (2013.01);
(Continued)

(58) Field of Classification Search
None
See application file for complete search history.

(56) References Cited

U.S. PATENT DOCUMENTS

2002/0058477 A1* 5/2002 Chapelle ............ H04B 7/18506
455/13.4
2002/0193118 A1* 12/2002 Jain ........................ H04W 28/12
455/453
(Continued)

FOREIGN PATENT DOCUMENTS

CN    1528061        9/2004
CN    1983844 A      6/2007
(Continued)

OTHER PUBLICATIONS

PCT Notification Concerning Transmittal of International Preliminary Report on Patentability (Chapter I) for PCT Counterpart Application No. PCT/CN2011/082536, (May 15, 2014), 7 pages.
(Continued)

*Primary Examiner* — Ayaz Sheikh
*Assistant Examiner* — Tarell Hampton
(74) *Attorney, Agent, or Firm* — NDWE LLP

(57) ABSTRACT

The present disclosure relates to an uplink congestion control scheme. In one embodiment, an uplink congestion control method is provided, comprising steps of: determining whether or not a congestion status of a serving cell is changed based on a rise over thermal, RoT, measurement; sending to a set of user equipment, UEs, a signaling to indicate the change of the congestion status; and performing an uplink congestion control based on the RoT measurement and with enhanced transmission format combination, E-TFC, reselection by at least one UE from the set of UEs based at least on the signaling.

20 Claims, 5 Drawing Sheets

(51) Int. Cl.
*H04W 52/34* (2009.01)
*H04W 28/02* (2009.01)
(52) U.S. Cl.
CPC ..... *H04W 28/0289* (2013.01); *H04W 52/241* (2013.01); *H04W 52/343* (2013.01); *H04W 52/146* (2013.01)

(56) References Cited

U.S. PATENT DOCUMENTS

| | | |
|---|---|---|
| 2003/0003921 A1 | 1/2003 | Laakso |
| 2003/0114127 A1* | 6/2003 | Baldwin ............. H04W 52/267 455/245.1 |
| 2004/0223474 A1* | 11/2004 | Kwon .................. H04W 28/22 370/335 |
| 2005/0111383 A1* | 5/2005 | Grob .................... H04W 52/06 370/254 |
| 2005/0113106 A1* | 5/2005 | Duan .................... H04L 1/0002 455/452.2 |
| 2006/0209869 A1* | 9/2006 | Kim ...................... H04W 52/16 370/431 |
| 2007/0026884 A1* | 2/2007 | Rao ....................... H04W 28/16 455/522 |
| 2007/0161394 A1* | 7/2007 | Kuroda ................. H04L 1/0015 455/522 |
| 2008/0198802 A1* | 8/2008 | Zhang ................... H04W 28/08 370/329 |
| 2008/0214197 A1* | 9/2008 | Englund ........... H04W 72/1278 455/450 |
| 2009/0097444 A1* | 4/2009 | Lohr .................... H04W 72/14 370/329 |
| 2009/0154403 A1* | 6/2009 | Niwano ............. H04W 52/282 370/329 |
| 2009/0161632 A1 | 6/2009 | Palenius et al. |
| 2010/0167777 A1* | 7/2010 | Raghothaman ..... H04W 52/146 455/522 |
| 2011/0038323 A1* | 2/2011 | Liang ................. H04L 12/5693 370/329 |
| 2011/0039544 A1* | 2/2011 | Fulghum ............... H04L 1/0002 455/423 |
| 2011/0053631 A1* | 3/2011 | Bottomley ............ H04W 52/08 455/522 |

FOREIGN PATENT DOCUMENTS

| | | |
|---|---|---|
| CN | 101521912 | 9/2009 |
| CN | 101677283 A | 3/2010 |
| CN | 101932031 | 12/2010 |
| EP | 1672941 A1 | 6/2006 |
| EP | 2117186 A1 | 11/2009 |
| WO | WO-01/80575 | 10/2001 |
| WO | WO-02/101956 A1 | 12/2002 |
| WO | WO-2010/039908 | 4/2010 |
| WO | WO-2012/108804 | 8/2012 |

OTHER PUBLICATIONS

Extended European Search Report for European Counterpart Application No. 11875198, (Feb. 10, 2015), 7 pages.
PCT International Search Report for PCT Counterpart Application No. PCT/CN2011/082536, (Aug. 16, 2012), 4 pages.
Fulghum, et al., "Adaptive Generalized Rake Reception in DS-CDMA Systems", *IEEE Transactions on Wireless Communications*, vol. 8, No. 7, (Jul. 2009), 11 pages.
Wigren, et al., "Estimation of uplink WCDMA load in a single RBS", *Proc. IEEE VTC-2007*, (Oct. 1-3, 2007), 5 pages.
Wigren, Torbjörn , "Soft Uplink Load Estimation in WCDMA", *IEEE Transactions on Vehicular Technology*, vol. 58, No. 2,, (Feb. 2009), 13 pages.
Communication pursuant to Article 94 (3) EPC from foreign counterpart European Patent Application No. 11875198.1, mailed Sep. 26, 2016, 6 pages.
Communication pursuant to Article 94 (3) EPC from foreign counterpart European Patent Application No. 11875198.1, mailed Apr. 13, 2017, 5 pages.
First Office Action and Search Report from foreign counterpart China Patent Application No. CN201180074645.4, mailed Mar. 29, 2017, 9 pages.

* cited by examiner

UPLINK CONGESTION CONTROL

CROSS-REFERENCE TO RELATED APPLICATIONS

This application is a National stage of International Application No. PCT/CN2011/082536, filed Nov. 21, 2011, which claims priority to United States Application No. 61/555,669, filed Nov. 4, 2011, which are hereby incorporated by reference.

TECHNICAL FIELD

The disclosure relates to wireless communication systems, and more particularly, to an uplink congestion control scheme.

BACKGROUND

In the uplink, the common radio resource shared among the user terminals is the total amount of tolerable interference, which is defined as the average interference over all the receiving (Rx) antennas. A relative measure of total interference is Rise over Thermal (RoT), i.e. total interference relative to thermal noise.

Uplink load control adjusts the load headroom for a cell so that the measured RoT is controlled towards a target RoT. The RoT measurement is available typically every radio frame (e.g., 10 ms). The uplink scheduler allocates available uplink (UL) load to scheduled UEs who require higher uplink bit-rate and reduce the granted uplink bit-rate of some scheduled UEs when the system is overloaded. Due to the large delay in uplink load control and uplink scheduler, including RoT measurement delay, Node B processing delay, grant processing delay, and the like, large RoT oscillation can occur, either higher or lower than the RoT target, and the RoT peak can last a long time before the RoT is reduced to an acceptable level. The reason for the peaks is typically a power rush in the UL, due to the coupling of the inner power control loops of the UEs.

The load factor represents a portion of uplink interference that a certain channel of a certain UE generates, and is defined as the interference due to the channel of that UE divided by the total interference. The total load factor of different channels equals to the sum of load factors due to the different channels.

Uplink load estimation estimates the load that has been or will be generated in each cell from different channels. Power based load estimation means load estimation according to the original definition of load factor as described above. A remarkable benefit of power based load estimation is that it is receiver independent and can naturally capture the receiver gain of various types of receivers.

UE selects enhanced transmission format combination (E-TFC) based on the constraints given by the maximum allowed transmission (Tx) power, the available data in the UE Tx buffer, and the scheduling grant sent by the Node Bs.

The available data in the UE Tx buffer determines the maximum data rate and the E-TFC (E-TFC$_{data}$) with which the UE needs to transmit.

The maximum allowed Tx power dividing downlink physical control channel (DPCCH) Tx power determines the maximum power offset with which the UE can transmit due to the Tx power limitation, which can in turn be mapped to an E-TFC limitation (E-TFC power).

The scheduling grant can directly be mapped to an E-TFC limitation given by the scheduler (E-TFC$_{grant}$).

The UE then selects the lowest allowed E-TFC (the minimum one among E-TFC$_{data}$, E-TFC$_{power}$, and E-TFC$_{grant}$) to transmit data.

In order to reduce the RoT peak level and suppress RoT peaks quickly, Fast Congestion Control (FCC) scheme has been introduced in Reference [1] and Reference [2]. It is proposed that transmission power control (TPC) down commands are sent to targetable UEs when measured RoT exceeds a target level. As FCC reacts much faster than uplink load control and scheduler, RoT can be better controlled and uplink load can be more efficiently utilized.

However, the RoT measurement used to trigger FCC should be updated at least as fast as the execution of inner loop power control, i.e. updated every slot (e.g., 0.667 ms). This increases complexity and requires more capable hardware.

Another drawback of FCC is that block error rate (BLER) of the targeted UEs by FCC will substantially increase. This may cause problem especially for UEs with relatively high QoS requirements. In this regard, the FCC scheme cannot be utilized too aggressively, and some load margin still needs to be reserved,

SUMMARY

To solve the above problems, this disclosure proposes a UE aided SCC scheme.

In a first embodiment of the present disclosure, there provides an uplink congestion control method including steps of: determining whether or not a congestion status of a serving cell is changed based on a rise over thermal, RoT, measurement; sending to a set of user equipments, UEs, a signaling to indicate the change of the congestion status; and performing an uplink congestion control based on the RoT measurement and with enhanced transmission format combination, E-TFC, reselection by at least one UE from the set of UEs based at least on the signaling.

The signaling may indicate "congested" if the serving cell enters congestion while not in congestion at the time the last RoT measurement was received. The signaling may indicate "not congested" if the serving cell leaves congestion while in congestion at the time the last RoT measurement was received. The signaling may also indicate a UE transmission power reduction level, and the E-TFC reselection of the at least one UE is further based on the indicated UE transmission power reduction level.

The UE transmission power reduction level may be determined based on a difference DeltaRoT between the measured RoT RoT$_{measure}$ and a configurable congestion detection threshold RoT$_{congestion\_threshold}$, i.e., $$\text{DeltaRoT} = \text{RoT}_{measure} - \text{RoT}_{congestion\_threshold}.$$

The UE transmission power reduction level P reduce may be determined according to $$P_{reduce} = \min(\max(0, m), \text{delta}_{max}), \text{ if } (m-1) \cdot \text{RoT}_{grid} \leq \text{DeltaROT} \leq m \cdot \text{RoT}_{grid},$$

where

RoT$_{grid}$ is a predefined parameter giving the quantification precision; and delta$_{max}$ is an upper limit of the UE transmission power reduction level.

Alternatively a UE transmission power reduction level can be predefined, and the E-TFC reselection of the at least one UE can be further based on the predefined UE transmission power reduction level.

The RoT measurement can be performed every radio frame or every multiple of radio frames.

The E-TFC reselection of the at least one UE may be that the at least one UE selects a lower E-TFC than that given by a scheduling grant and a maximum transmission power for the at least one UE.

The set of UEs can be predefined or selected according to capabilities of UEs in the serving cell. For example, the set of UEs can be formed by only selecting E-TFC reselection enabled UEs.

In a second embodiment of the present disclosure, there provides a base station, including: a congestion status determining unit configured to determine whether or not a congestion status of a serving cell of the base station is changed based on a rise over thermal RoT measurement; a transmitter configured to send to a set of user equipments, UEs, a signaling to indicate the change of the congestion status determined by the congestion status determining unit; and an uplink congestion control unit configured to perform an uplink congestion control based on the RoT measurement and with enhanced transmission format combination, E-TFC, reselection by at least one UE from the set of UEs based at least on the signaling sent by the transmitter.

The signaling may indicate "congested" if the serving cell enters congestion while not in congestion at the time the last RoT measurement was received. The signaling may indicate "not congested" if the serving cell leaves congestion while in congestion at the time the last RoT measurement was received. The base station may further include a UE transmission power reduction level determining unit configured to determine a UE transmission power reduction level, the signaling may also indicate the UE transmission power reduction level, and the E-TFC reselection of the at least one UE is further based on the indicated UE transmission power reduction level.

The UE transmission power reduction level determining unit may be configured to determine the UE transmission power reduction level based on a difference DeltaRoT between the measured RoT $RoT_{measure}$ and a configurable congestion detection threshold $RoT_{congestion\_threshold}$, i.e, $$DeltaRoT = RoT_{measure} - RoT_{congestion\_threshold}.$$

The UE transmission power reduction level determining unit may be configured to determine the UE transmission power reduction level $P_{reduce}$ according to $$P_{reduce} = \min(\max(0, m), delta_{max}), \text{ if } (m-1) \cdot RoT_{grid} \leq DeltaROT \leq m \cdot RoT_{grid},$$

where $RoT_{grid}$ is a predefined parameter giving the quantification precision; and $delta_{max}$ is an upper limit of the UE transmission power reduction level.

The RoT measurement can be performed every radio frame or every multiple of radio frames.

The base station may further include a UE set forming unit configured to form the set of UEs according to capabilities of UEs in the serving cell. For example, the UE set forming unit may be configured to form the set of UEs by only selecting E-TFC reselection enabled UEs.

In a third embodiment of the present disclosure, there provides a computer-readable storage medium having computer-readable instructions to facilitate user equipment UE aided slow congestion control SCC, that are executable by a computing device to carry out the method according to the first embodiment of the present disclosure.

With respect to the above all embodiments described, the proposed UE aided SCC scheme may at least mitigate (excessive) DPCCH and E-DPDCH quality decrease and BLER increase;

adopt more aggressive SCC to further exploit the benefit from SCC;

further improve uplink load utilization and consequently improve throughput;

cost marginal signaling cost; and be implemented easily.

BRIEF DESCRIPTION OF THE DRAWINGS

The above and other objects, features and advantages of the present disclosure will be clearer from the following detailed description about the non-limited embodiments of the present disclosure taken in conjunction with the accompanied drawings, in which.

DETAILED DESCRIPTION OF EMBODIMENTS

Hereunder, the embodiments of the present disclosure will be described in accordance with the drawings. In the following description, some particular embodiments are used for the purpose of description only, which shall not be understood as any limitation to the present disclosure but the examples thereof. While it may blur the understanding of the present disclosure, the conventional structure or construction will be omitted.

To mitigate the problem with FCC scheme (i.e., high requirement on the fast RoT measurement which may not be supported by major Node B hardware today), slow congestion control (SCC) scheme has been proposed in U.S. provisional application No. 61/555,669 filed on Nov. 4, 2011, which is enclosed herein with its entirety for reference. In the SCC scheme, congestion control is based on a radio frame based RoT measurement (sampling rate of e.g., 10 ms). The basic idea is that Node B sends a configurable number of consecutive TPC down commands to a selected subset of UEs when a new received RoT measurement is above a configurable SCC trigger threshold, and thereafter, DPCCH power of the subset of UEs is held by toggling TPC commands (up/down/up/down . . . ) for a configurable number of radio frames. The normal inner loop power control is recovered when a new received RoT measurement is below the SCC trigger configurable threshold (or another configurable SCC release threshold if necessary). With the SCC scheme, RoT can also be better controlled which in turn yields an improved uplink performance.

SCC Scheme

Figure 1:
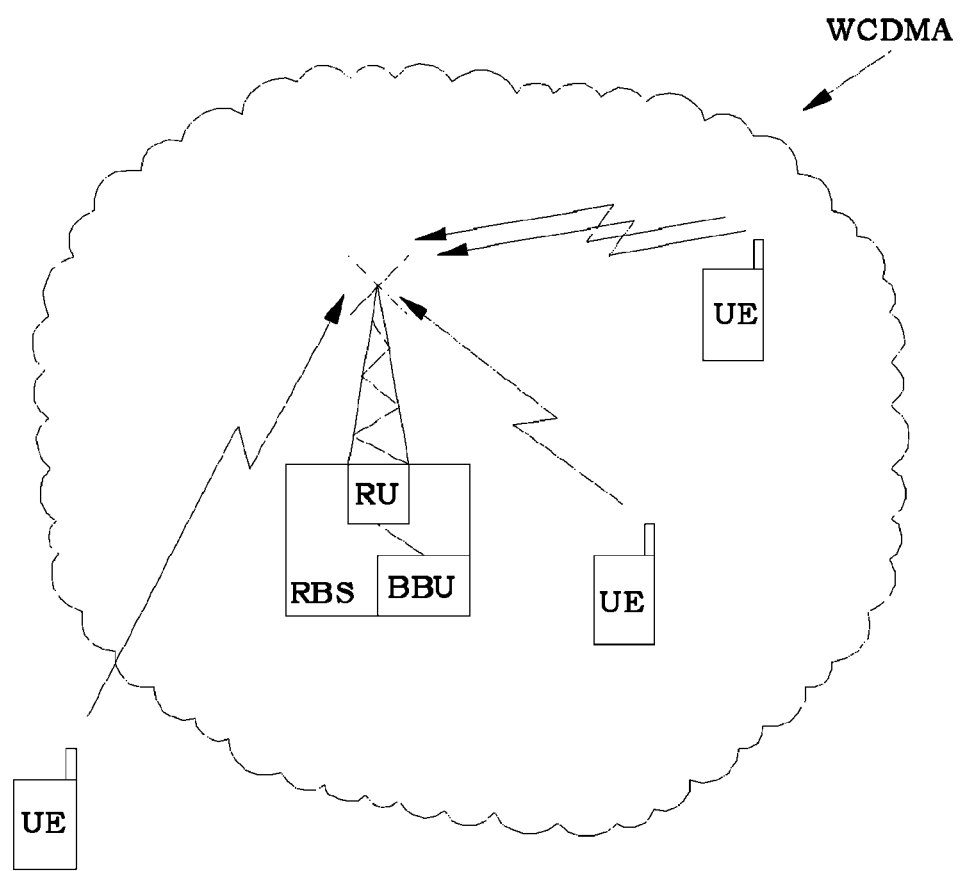
FIG. 1 is shows an embodiment of a typical WCDMA system.

FIG. 1 shows an embodiment of a typical WCDMA system. A number of UEs communicate with a Node B (one specific example of base station) via UL signaling. As an example, the Node B comprises a Radio Unit (RU) and Base Band Units (BBUs). Of course, the application of the disclosed technique is not limited only to the WCDMA system. The disclosed technique may be also applied to any other suitable existing or future wireless communication systems such as CDMA system, LTE system, and the like.

Figure 2:
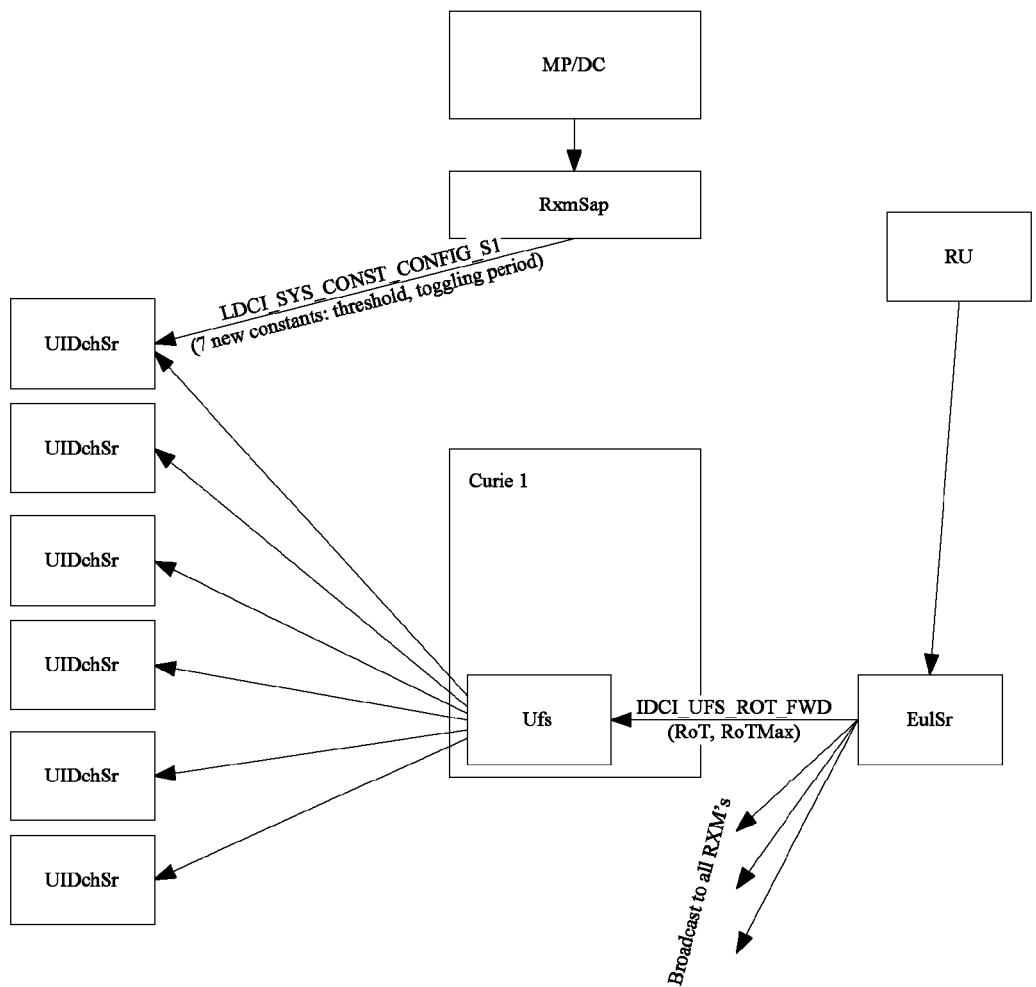
FIG. 2 depicts an example embodiment of an SCC architecture in a radio base station.

FIG. 2 depicts an example embodiment of an SCC architecture in a radio base station. The signal path of RoT measurement from RU to the EUL scheduler (EulSr) is shown. From there the measurement is distributed within baseband, via the Curie circuit.

The main delay of the RoT measurement occurs in
1. The averaging of the RTWP measurement over a radio frame, i.e., 15 slots. This occurs in RU and amounts to some 5 milliseconds (ms).
2. The computation of the RoT. This occurs in RU and amounts to <1 ms.
3. The transfer of the RoT measurement to the interface to BBU. This occurs in RU and may amount to a few ms.
4. The reception delay on the BBU side, until the distribution takes place. This may require up to one radio frame, depending on signal alignment. In one embodiment, aligning the signaling, the EUL scheduler is delayed until the present RoT is received, which may shorten the delay by almost one radio frame. A typical value of the delay without delay of the scheduler start is 16 ms. This is reduced to 8 ms with a delayed scheduler start.

The preferred SCC method may consist of two main routines, one executed at the radio frame rate (e.g., 10 ms) following the RoT measurement, and the other executed at slot rate (e.g., 0.667 ms).

Radio Frame Rate Routine

Below, Y is a counter initially set to 0. When activated it is used to define the toggling length while RoT is above a threshold (SCC trigger threshold). The pseudo code of the SCC radio frame rate routine is:

```
IF new IDCI_UFS_RoT_FWD received   // new RoT value //
    IF RoT > eulMaxRoT + SccRoTThreshold (−3 dB)
        IF counter Y has expired (Y=0)
            Start counter, initiate to Y = sccToggleLength(2) − 1
            FOR EACH E-DCH with an RL in this cell
                IF Frame SIR > sccMinFrameSir2ms/10ms (3 dB)
                    sccNumForcedTpcDown(3) slots down, overrides
                    TPC
                    slow followed by TPC toggling-
                ELSE //Frame SIR <= SccMinFrameSir2ms/10ms
                    (3 dB) //
                    TPC toggling
                ENDIF
            END FOR
        ELSE   // Y counter not expired //
            Decrease counter Y (Y=Y−1)
        ENDIF
    ELSE   // RoT <= eulMaxRoT + sccRoTThreshold (−3 dB) //
        Break all SCC handling for all E-DCH
        reset counter Y (Y=0)
    ENDIF
ENDIF
```

Figure 3:
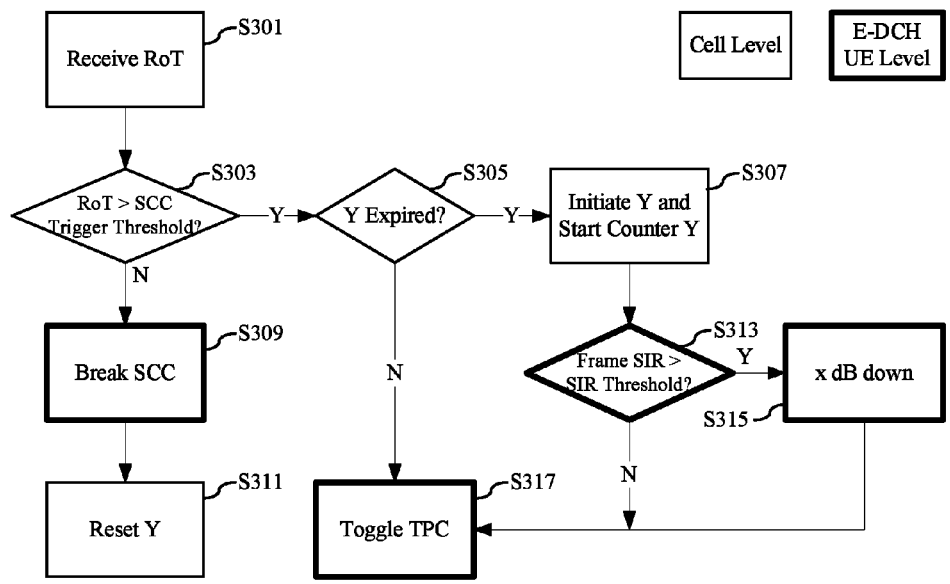
FIG. 3 shows the corresponding flow chart of the SCC radio frame rate routine.

FIG. 3 shows the corresponding flow chart of the SCC radio frame rate routine. As shown in FIG. 3, the SCC radio frame rate routine is triggered by the reception of a new RoT measurement (S301). It is then checked if the RoT measurement is above a configurable SCC trigger threshold, eulMaxRoT+SccRoTThreshold (S303). If this is the case (S303: Yes), then the routine has detected a power rush. Note that the SCC specific parameter SccRoTThreshold is given with respect to the parameter eulMaxRoT which is related to the cell coverage. This way normal behavior experienced by different users is not severely affected, since eulMaxRoT is normally larger than SccRoTThreshold, and since operators tend to set eulMaxRoT at very different levels.

In case of a power rush (S303: Yes), then next step is to restart the counter Y in case it has expired (S305 and S307). In case no power rush is detected (S303: No), any ongoing SCC is stopped (S309) and the counter Y is reset (S311).

Proceeding with the case of a power rush, the SCC radio frame rate routine loops over all enhanced dedicated channel (E-DCH) UEs. For each UE, it determines if the frame SIR value of the UE is above an SIR threshold sccMinFrameSir2 ms/10 ms (S313), which may be different for 2 ms and 10 ms UEs. If larger (S313: Yes), then a preconfigured number of consecutive power down commands (TPC down commands) are issued by the SCC radio frame rate routine (S315), followed by toggling (commanding power up/down/up/down and so forth) (S317). In case the frame SIR value is not above the SIR threshold (S313: No), only the toggling is performed (S317). The rationale behind this logic is that it is desirable to reduce the UE power, but not too much since the SIR may then become so low that link performance is reduced.

Slot Rate Routine

The SCC slot rate routine essentially provides a safety net against very low SINR values and too high SINR values. These situations may arise due to fading that is faster than the SCC radio frame rate routine (e.g., 10 ms). This slot rate routine overrides the above SCC radio frame rate routine. The pseudo code of the SCC slot rate routine is:

```
IF [Frame SIR < sccProtectedFrameSir2ms/10ms (0 dB)] AND
    [SlotSIR <= TargetSIR + SccTargetSirMargin]
        Follow TPC   //TPC slow for 2 ms if TPC slow on
        ELSEIF SlotSIR > TargetSIR + SccTargetSirMargin,
            1 dB down   //override TPC slow
END IF
```

Note that the above presented pseudo code only is a typical illustration of an implementation of the basic ideas. Many other detailed implementations are possible as well.

Figure 4:
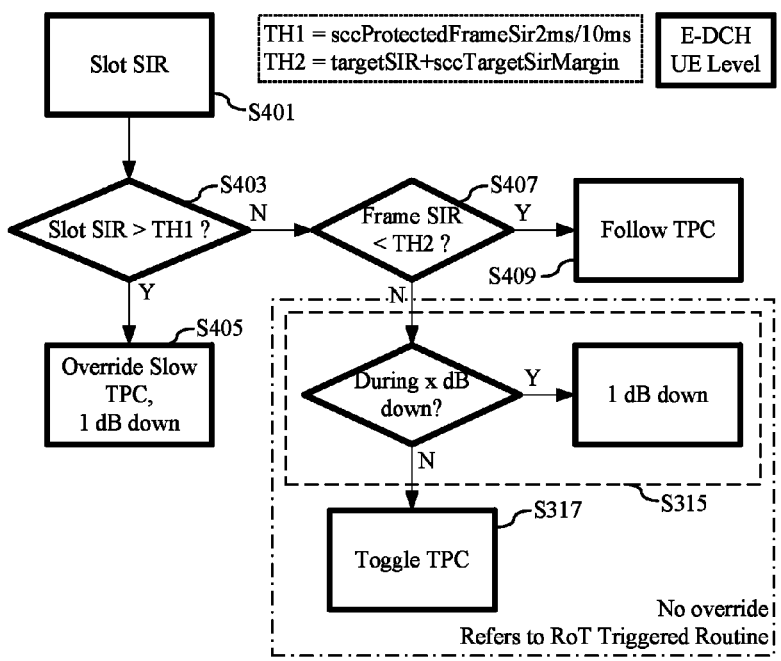
FIG. 4 shows the corresponding flow chart of the SCC slot rate routine.

FIG. 4 shows the corresponding flow chart of the SCC slot rate routine. As shown in FIG. 4, the SCC slot rate routine is triggered by the reception of a new slot SIR (S401). As can be seen, the first if-clause of the pseudo code secures that the SIR values may not become too low, if they do that for a UE, then the fast inner loop power control is released for that UE (S403: No~ S407: Yes~ S409).

The "elseif" of the pseudo code clause guards against too high values, in which case a 1 dB down (the maximum per slot) is commanded to this UE (S403: Yes→S405).

Parameters

The following is a list of the system constants (a type of parameter in the RBS SW), that affect the SCC algorithm and that are available for tuning. As can be seen some parameters are different for 2 ms and 10 ms users. The list gives a typical set of default values for the system constants, together with a range.

sccRoTThreshold: default −3 dB, range same as eulMaxRoT
SCC trigger threshold=eulMaxRoT+sccRoTThreshold
sccMinFrameSir2 ms: default 3 dB, range same as SIR target Minimum Frame SIR threshold for 2 ms UEs for triggering forced TPC down
sccMinFrameSir10 ms: default 3 dB, range same as SIR target Minimum Frame SIR threshold for 10 ms UEs for triggering forced TPC down sccProtectedFrameSir2 ms: default 0 dB, range same as SIR target Frame SIR protection threshold for 2 ms UEs sccProtectedFrameSir10 ms: default 0 dB, range same as SIR target Frame SIR protection threshold for 10 ms UEs sccToggleLength: default 2, range 1 . . . 10
  Toggling Length while RoT is above SCC trigger threshold, calculated by the number of RoT measurements that are above the SCC trigger threshold sccNumTpcDown: default 3, range 0.15
  Number of Consecutive TPC Down commands sccTargetSirMargin: default 0, range 0-100 (max value to switch off)
  Margin on target SIR against too high slot SIR The default values are only indicative of typical settings. Initial test indicates that it may be advantageous to increase the existing system parameter eulMaxRoT to 15-20 dB, while using a value for sccRoTThreshold of −5 to −10 dB.

For the SCC, a similar problem as FCC is that the block error rate (BLER) of the targeted UEs may also increase. This is because DPCCH quality is decreased with the SCC action, i.e., a configurable number of consecutive TPC down commands sent to the selected UEs, when congestion is detected at the Node B.

Correspondingly, enhanced downlink physical data channel (E-DPDCH) quality is also decreased leading to higher BLER. To avoid excessive BLER increase, some load margin may still needs to be reserved with SCC scheme.

The SCC scheme may be further improved with the assistance of UEs. First, when a new RoT measurement is received and the system status regarding congestion is changed (e.g., from un-congested to congested, or the congestion level is changed), an explicit signaling is sent to a selected subset of UEs to inform about the status change. In case the system is in congestion, the selected UEs reduce their Tx power and accordingly choose a lower E-TFC to avoid excessive E-DPDCH quality drop, thus protecting the data transmission until a new absolute grant is received from Node B.

At Node B, SCC is performed with different parameters settings so that less or no forced TPC down commands are generated thus an excessive DPCCH quality drop is mitigated.

As UE can perform E-TFC selection fairly fast (e.g., every 2 ms) with small delay, this can keep SCC's effect in decreasing interference while avoiding excessive DPCCH and E-DPDCH quality drop thus a more aggressive SCC can be adopted and SCC's benefit can be improved. At the same time, because the RoT measurement for SCC is updated at a much slower rate (e.g., 10 ms), the cost brought by the new signaling is limited.

For the SCC, the congestion status is detected when a new frame level RoT measurement is received (e.g., S301 in FIG. 3), based on the comparison of the RoT measurement and a configurable SCC trigger threshold (e.g., S303 in FIG. 3).

Figure 5:
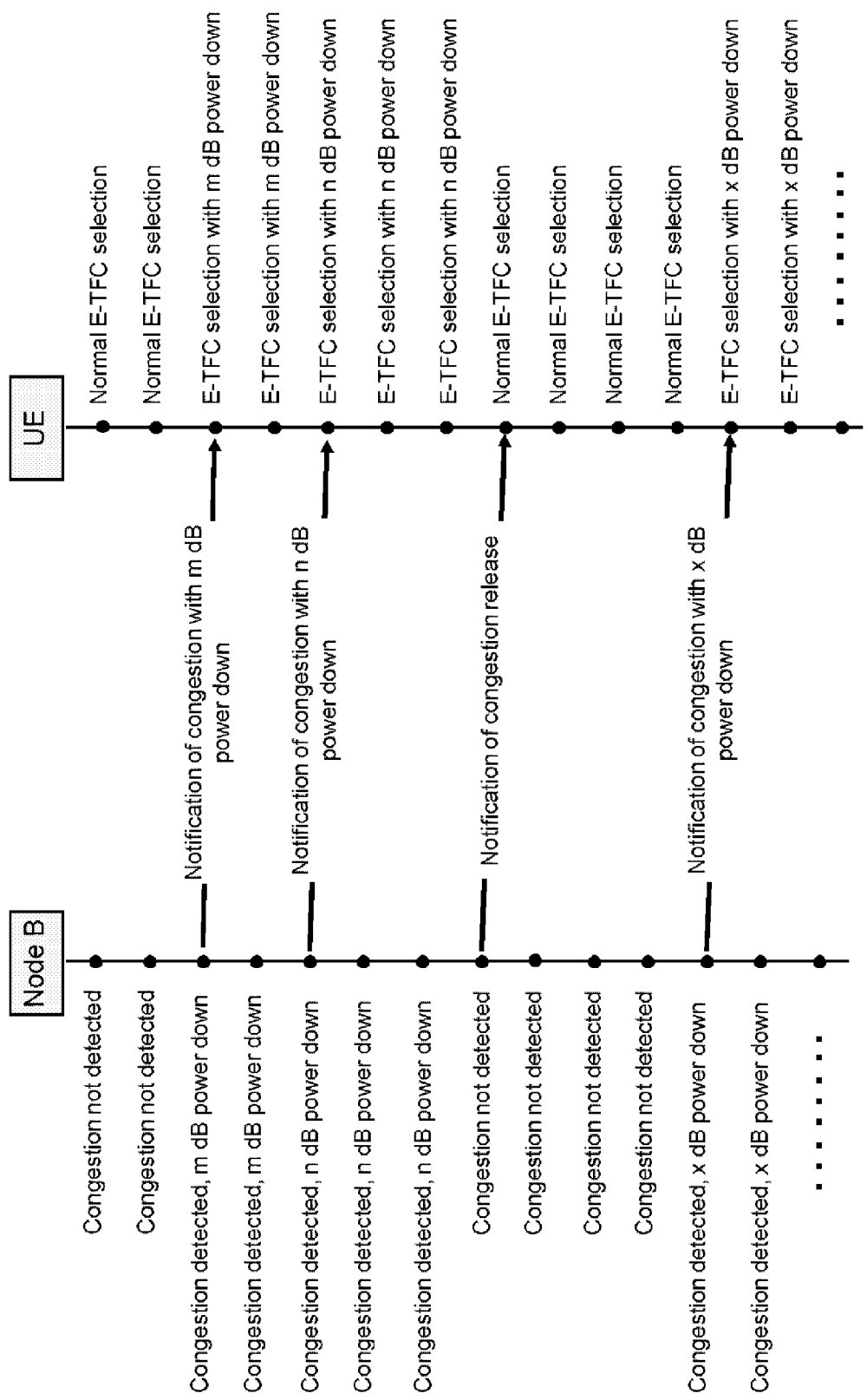
FIG. 5 shows a sequential diagram to illustrate the newly introduced signaling.

A new signaling is introduced to inform the UE about the change of system congestion status. More specifically, If a cell leaves congestion while in congestion at the time the last RoT measurement was received,
  Send "not congested" to the selected subset of UEs If a cell enters congestion while not in congestion at the time the last RoT measurement was received,
  Send "congested" and the level of UE Tx power to be reduced to the selected subset of UEs Optionally, if a cell is in congestion but changes the congestion level Inform "congested" and the level of UE Tx power to be reduced to the selected subset of UEs As a non-limiting example, FIG. 5 shows a sequential diagram to illustrate the newly introduced signaling. In case the system is in congestion, the selected UEs reduce their Tx power and accordingly choose a lower E-TFC to avoid excessive E-DPDCH quality drop (to be detailed later).

The Node B decides how much the UE Tx power should be reduced depending on difference (DeltaRoT) between the measured RoT ($RoT_{measure}$) and a configurable congestion detection threshold ($ROT_{congestion\_threshold}$), i.e., $$DeltaRoT = RoT_{measure} - RoT_{congestion\_threshold}.$$

The Node B can then decide UE Tx power reduction level ($P_{reduce}$) e.g. according to $$P_{reduce} = \min(\max(0,m), \text{delta}_{max}), \text{ if } (m-1) \cdot RoT_{grid} \leq DeltaROT \leq m \cdot RoT_{grid},$$

Here $RoT_{grid}$ is a predefined parameter giving the quantification precision when determining the level of power to reduce from DeltaRoT. The quantity m (m≥0) is the UE Tx power level needs to be reduced. $\text{delta}_{max}$ is an upper bound on the UE Tx power reduction. $\text{delta}_{max}$ and $RoT_{grid}$ are system configurable parameters.

For example, if $RoT_{grid}$ is 1 dB and DeltaRoT is 3.5 dB, the power reduction level is m=4. If $RoT_{grid}$ is 2 dB, the power reduction level is m=2. Therefore, the smaller the $RoT_{grid}$, the more accurate of the power adjustment, but at the same time, more bits are needed in the signaling to inform UE the power reduction level.

Figure 6:
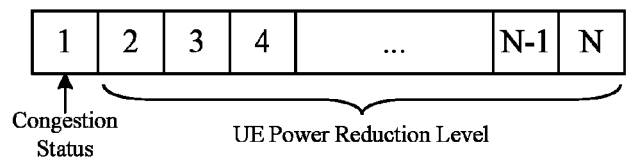
FIG. 6 is a schematic diagram of the signaling format.

FIG. 6 is a schematic diagram of the signaling format. The signaling may contain N bits and express $2^N$ different status. For example, the first bit can be used to indicate the congestion status ("0" to indicate "not congested", and "1" to indicate "congested"), and the other $2^{N-1}$ values to indicate different $2^{N-1}$ UE Tx power reduction levels.

With no limitations, a simplification of this signaling is to adopt a one bit signaling to indicate whether the cell is in congestion or not. Once the cell is in congestion, the UE Tx power is reduced for a predefined configurable step.

The signaling can be sent via e.g., HS-SCCH or relative grant. Relative grant today is used to decrease the grant for users in non-serving cell(s), but here it can be used to indicate congestion status and optionally UE Tx power to be reduced for UEs in the serving cell.

As the RoT measurement for SCC is updated every radio frame (e.g., 10 ms), the congestion status is changed at most every radio frame or less, the signaling informing the congestion status also only needs to be sent every radio frame or less (e.g., every multiple of radio frames).

Rules to select the target UEs to perform SCC can be pre-defined, such as only the non-Guarded Bit Rate (GBR) UEs transmitting with large file size and/or TDM scheduled and in TDM active phase can be the targeted SCC UEs. These rules can be sent to UEs in advance and then the signaling informing the congestion status can be sent via common channel, which further reduces the signaling cost.

As previously shown in FIG. 5, in case the system is in congestion, the selected UEs reduce their Tx power and accordingly choose a lower E-TFC to avoid excessive E-DPDCH quality drop. In details, when the SCC targeted UE receives a new message informing that its serving cell is in congestion, the UE starts the congestion handling procedure. For example, this can be implemented by selecting a smaller E-TFC than the limit given by the grant and maximum UE Tx power, i.e., an E-TFC smaller than minimum of E-TFC$_{power}$ and E-TFC$_{grant}$ (UE E-TFC reselection) so that the total UE Tx power is decreased by expected level, which is either predefined or explicitly indicated in the congestion notification message.

In case the UE E-TFC re-selection as described above is adopted, which means the Node B will generate the message indicating the congestion status, the relevant parameters (cf. PARAMETERS) can be so configured that less (or no) forced TPC down commands are generated and TPC toggling can optionally also be ended earlier. More specially, Number of forced TPC down commands can be decreased by:
  Set a smaller sccNumTpcDown, and/or
  Set a higher sccMinFrameSir2 ms/10 ms, and/or
  Set a higher sccProtectedFrameSir2 ms/10 ms.
Period of TPC toggling can be decreased by:
  Set a smaller sccToggleLength, and/or
  Set a higher sccProtectedFrameSir2 ms/10 ms.

A higher sccProtectedFrameSir2 ms/10 ms is more preferred for UEs transmitting services with high QoS requirement; a higher sccMinFrameSir2 ms/10 ms is more preferred for UEs transmitting services with medium QoS requirement; while a smaller sccNumTpcDown is more preferred for UEs transmitting services with low QoS requirement.

Not all UEs may be capable of performing E-TFC re-selection as described above. Therefore, according to one embodiment, either the UE may inform the network whether it is capable of interpreting the instruction from the network and performing the E-TFC re-selection or not, or the network implicitly determines if the UE has this capability or not. The implicit determination can be based on if the power offset that the UE adopts is aligned with the E-TFC it actually transmits with according to the power offset to E-TFC table stored in the system.

Based on the above mentioned UE capability information the system can:
  Determine if the UE E-TFC re-selection should be adopted. If only a few or no UE can perform E-TFC re-selection, the E-TFC re-selection scheme may be ignored. This can save the signaling cost.
  Select the SCC candidate UEs. One example is that E-TFC re-selection capable UEs are selected to be the SCC candidate UEs. This further improves the system performance.

Figure 7:
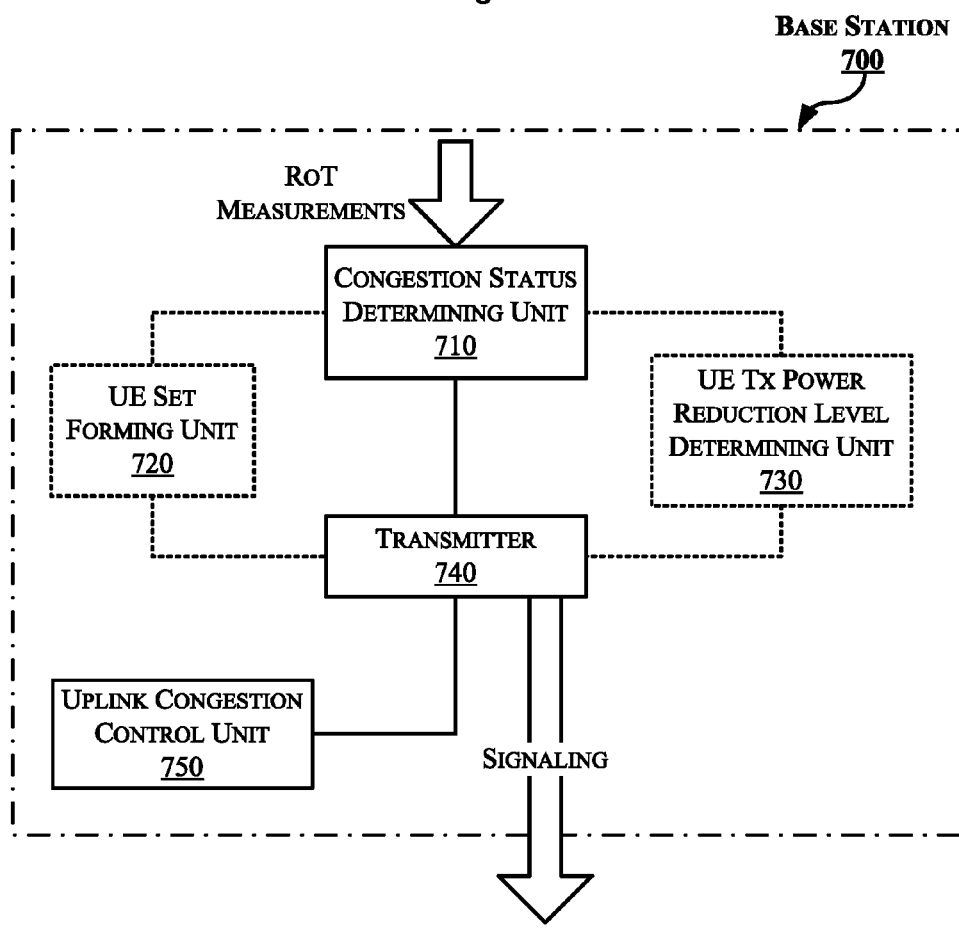
FIG. 7 shows a schematic block diagram of a base station 700 according to one embodiment of the present disclosure.

As a non-limiting example, FIG. 7 shows a schematic block diagram of a base station 700 according to one embodiment of the present disclosure. For example, the base station 700 may include one or more of a congestion status determining unit 710, a UE set forming unit 720, a UE Tx power reduction level determining unit 730, a transmitter 740, and/or an uplink congestion control unit 750. The base station 700 can be any suitable node in the existing or future wireless communication systems, such as Node B in WCDMA system, eNode B in LTE system, and the like.

As an example, the congestion status determining unit 710 may be configured to determine whether or not a congestion status of a serving cell of the base station 700 is changed when a new frame level RoT measurement is received (e.g., S301 in FIG. 3), based on the comparison of the RoT measurement and a configurable SCC trigger threshold (e.g., S303 in FIG. 3). For example, the RoT measurement may be performed every radio frame (e.g., 10 ms) or every multiple of radio frames.

The UE set forming unit 720 may be configured to form a set of UEs to which the change of the congestion status to be informed. The set of UEs can be selected according to capabilities of UEs in the serving cell. For example, the UE set forming unit 720 may be configured to form the set of UEs by only selecting those E-TFC reselection enabled UEs. Alternatively, the set of UEs can be predefined, such as only the non-GBR UEs transmitting with large file size and/or TDM scheduled and in TDM active phase can be the targeted SCC UEs. In this predefinition scenario, the UE set forming unit 720 may be omitted, and thus is indicated with dotted block in FIG. 7.

In case of not only informing the change of congestion status but also informing the change in congestion level, the UE Tx power reduction level determining unit 730 may be configured to determine a UE Tx power reduction level. As described above, the UE Tx power reduction level determining unit 730 may be configured to determine the UE transmission power reduction level based on a difference (DeltaRoT) between the measured RoT (RoT$_{measure}$) and a configurable congestion detection threshold (POT$_{congestion\_threshold}$), DeltaRoT=RoT$_{measure}$−RoT$_{congestion\_threshold}$.

Further, as also described above, the UE Tx power reduction level determining unit 730 may then configured to determine the UE transmission power reduction level P$_{reduce}$ according to P$_{reduce}$=min(max(0,m),delta$_{max}$), if (m−1)·
  RoT$_{grid}$≤DeltaROT≤m·RoT$_{grid}$, Alternatively, the UE Tx power reduction level can be predefined, and once the cell is in congestion, the UE Tx power is reduced for a predefined configurable step. In this predefinition scenario, the UE Tx power reduction level determining unit 730 may be omitted, and thus is indicated with dotted block in FIG. 7.

The transmitter 740 may be configured to send to the set of UEs a signaling to indicate the change of the congestion status determined by the congestion status determining unit 710 and/or the change of the congestion level determined by the UE Tx power reduction level determining unit 730. For example, the signaling format shown in FIG. 6 can be used. As described above, the signaling may indicate "congested" if the serving cell enters congestion while not in congestion at the time the last RoT measurement was received; the signaling may indicate "not congested" if the serving cell leaves congestion while in congestion at the time the last RoT measurement was received; and the signaling may optionally indicate the UE Tx power reduction level determined by the UE Tx power reduction level determining unit 730.

The uplink congestion control unit 750 may be configured to perform an uplink congestion control based on the RoT measurement (e.g., an SCC control as described above in conjunction with FIGS. 3 and 5), also with the assistant of E-TFC reselection by at least one UE from the set of UEs based at least on the signaling sent by the transmitter 740. In case the system is in congestion, the at least one UE from the set of UEs reduces its Tx power and accordingly chooses a lower E-TFC to avoid excessive E-DPDCH quality drop. In details, when the SCC targeted UE receives a new message informing that its serving cell is in congestion, the UE starts the congestion handling procedure. For example, this can be implemented by selecting a smaller E-TFC than the limit given by the grant and maximum UE Tx power, i.e., an E-TFC smaller than minimum of E-TFC$_{power}$ and E-TFC$_{grant}$ (UE E-TFC reselection) so that the total UE Tx power is decreased by expected level, which is either predefined or explicitly indicated in the congestion notification message.

With respect to the above all embodiments described, the proposed UE aided SCC scheme may at least
- mitigate (excessive) DPCCH and E-DPDCH quality decrease and BLER increase;
- adopt more aggressive SCC to further exploit the benefit from SCC;
- further improve uplink load utilization and consequently improve throughput;
- cost marginal signaling cost; and
- be implemented easily.

Other arrangements of the present disclosure include software programs performing the steps and operations of the method embodiments, which are firstly generally described and then explained in detail. More specifically, a computer program product is such an embodiment, which comprises a computer-readable medium with a computer program logic encoded thereon. The computer program logic provides corresponding operations to provide the above described UE aided SCC scheme when it is executed on a computing device. The computer program logic enables at least one processor of a computing system to perform the operations (the methods) of the embodiments of the present disclosure when it is executed on the at least one processor. Such arrangements of the present disclosure are typically provided as: software, codes, and/or other data structures provided or encoded on a computer-readable medium such as optical medium (e.g. CD-ROM), soft disk, or hard disk; or other mediums such as firmware or microcode on one or more ROM or RAM or PROM chips; or an Application Specific Integrated Circuit (ASIC); or downloadable software images and share database, etc., in one or more modules. The software, hardware, or such arrangements can be mounted on computing devices, such that one or more processors in the computing device can perform the technique described by the embodiments of the present disclosure. Software process operating in combination with e.g. a group of data communication devices or computing devices in other entities can also provide the nodes and host of the present disclosure. The nodes and host according to the present disclosure can also be distributed among a plurality of software processes on a plurality of data communication devices, or all software processes running on a group of mini specific computers, or all software processes running on a single computer.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

BBU Base Band Unit
BLER Block Error Ratio
DPCCH Downlink Physical Control CHannel
EUL Enhanced Uplink
EulSr EUL Scheduler
E-DCH Enhanced Dedicated CHannel
E-DPDCH Enhanced Downlink Physical Data CHannel
E-TFC Enhanced Transmission Format Combination
FCC Fast Congestion Control
GBR Guarded Bit Rate
HS-SCCH High Speed Shared Control CHannel
LTE Long Term Evolution
QoS Quality of Service
RL Radio Link
RoT Rise over Thermal
RTWP Received Total Wideband Power
RU Radio Unit
Rx Receiving
SCC Slow Congestion Control
SINR Signal to Interference plus Noise Ratio
SIR Signal to Interference Ratio
TDM Time Division Multiplexing TPC Transmission Power Control
Tx Transmitting
UE User Equipment
UL Uplink

REFERENCES

[1] WO 2001/080575 A2; and
[2] US 2003/0003921 A1.

What is claimed is:

1. An uplink congestion control method, comprising steps of:
   determining, by a base station, that a congestion status of a serving cell is changed based on a rise over thermal (RoT) measurement, wherein the determining includes comparing the RoT measurement to a threshold value based on cell coverage of the serving cell, and wherein the RoT measurement is performed every radio frame or every multiple of radio frames to provide a first power control and a Signal to Interference Ratio is measured for every time slot to provide a second power control;
   sending, by the base station, to a set of user equipment (UEs) a signaling to indicate the change of the congestion status and a UE transmission power reduction level, wherein the set of UEs are selected from a plurality of UEs based on the set of UEs being enhanced transmission format combination (E-TFC) reselection enabled; and
   performing an uplink congestion control based on the RoT measurement and E-TFC reselection by at least one UE from the set of UEs, wherein the E-TFC reselection is based at least on the indicated change of the congestion status and the UE transmission power reduction level.

2. The uplink congestion control method according to claim 1, wherein the signaling indicates "congested" if the serving cell enters congestion while not in congestion at the time the last RoT measurement was received.

3. The uplink congestion control method according to claim 1, wherein the signaling indicates "not congested" if the serving cell leaves congestion while in congestion at the time the last RoT measurement was received.

4. The uplink congestion control method according to claim 1, wherein the UE transmission power reduction level is determined based on a difference, DeltaRoT, between the measured RoT, $RoT_{measure}$, and a configurable congestion detection threshold, $RoT_{congestion\_threshold}$, such that:

$$DeltaRoT = RoT_{measure} - RoT_{congestion\_threshold}.$$

5. The uplink congestion control method according to claim 4, wherein the UE transmission power reduction level, $P_{reduce}$, is determined according to $$P_{reduce} = \min(\max(0,m), delta_{max}), \text{ if}(m-1) \cdot ROT_{grid} \leq DeltaRoT \leq m \cdot ROT_{grid},$$

where
 m is a non-zero integer;
 $ROT_{grid}$ is a predefined parameter giving a quantification precision; and
 $delta_{max}$ is an upper limit of the UE transmission power reduction level.

6. The uplink congestion control method according to claim 1, wherein
 a UE transmission power reduction level is predefined; and
 the E-TFC reselection by the at least one UE is further based on the predefined UE transmission power reduction level.

7. The uplink congestion control method according to claim 1, wherein the E-TFC reselection by the at least one UE is that the at least one UE selects a E-TFC lower than that given by a scheduling grant and a maximum transmission power for the at least one UE.

8. A base station, comprising:
 a congestion status determining unit configured to determine whether or not a congestion status of a serving cell of the base station is changed based on a rise over thermal (RoT) measurement, wherein the determining includes comparing the RoT measurement to a threshold value based on cell coverage of the serving cell, wherein the RoT measurement is performed every radio frame or every multiple of radio frames to provide a first power control and a Signal to Interference Ratio is measured for every time slot to provide a second power control;
 transmitter configured to send to a set of user equipment (UEs) a signaling to indicate the change of the congestion status determined by the congestion status determining unit and a UE transmission power reduction level, wherein the set of UEs are selected from a plurality of UEs based on the set of UEs being enhanced transmission format combination (E-TFC) reselection enabled; and
 an uplink congestion control unit configured to perform an uplink congestion control based on the RoT measurement and E-TFC reselection by at least one UE from the set of UEs, wherein the E-TFC reselection is based at least on the indicated change of the congestion status and the UE transmission power reduction level sent by the transmitter.

9. The base station according to claim 8, wherein the signaling indicates "congested" if the serving cell enters congestion while not in congestion at the time the last RoT measurement was received.

10. The base station according to claim 8, wherein the signaling indicates "not congested" if the serving cell leaves congestion while in congestion at the time the last RoT measurement was received.

11. The base station according to claim 8, wherein the UE transmission power reduction level determining unit is further configured to determine the UE transmission power reduction level based on a difference, DeltaRoT, between the measured RoT, $RoT_{measure}$, and a configurable congestion detection threshold, $RoT_{congestion\_threshold}$, such that:

$$DeltaRoT = RoT_{measure} - RoT_{congestion\_threshold}.$$

12. The base station according to claim 11, wherein the UE transmission power reduction level determining unit is further configured to determine the UE transmission power reduction level, $P_{reduce}$, according to $$P_{reduce} = \min(\max(0,m), delta_{max}), \text{ if}(m-1) \cdot ROT_{grid} \leq DeltaRoT \leq m \cdot ROT_{grid},$$

where
 m is a non-zero integer;
 $ROT_{grid}$ is a predefined parameter giving a quantification precision; and
 $delta_{max}$ is an upper limit of the UE transmission power reduction level.

13. The base station according to claim 8, further comprising:
 a UE set forming unit configured to form the set of UEs according to capabilities of UEs in the serving cell.

14. A non-transitory computer-readable storage medium storing instructions for performing uplink congestion control, when executed by a computing device, the instructions causing the computing device to:
 determine that a congestion status of a serving cell is changed based on a rise over thermal (RoT) measurement, wherein the determination includes comparing the RoT measurement to a threshold value based on cell coverage of the serving cell, and wherein the RoT measurement is performed every radio frame or every multiple of radio frames to provide a first power control and a Signal to Interference Ratio is measured for every time slot to provide a second power control;
 send to a set of user equipment (UEs) a signaling to indicate the change of the congestion status and a UE transmission power reduction level, wherein the set of UEs are selected from a plurality of UEs based on the set of UEs being enhanced transmission format combination (E-TFC) reselection enabled; and
 perform an uplink congestion control based on the RoT measurement and E-TFC reselection by at least one UE from the set of UEs, wherein the E-TFC reselection is based at least on the indicated change of the congestion status and the UE transmission power reduction level.

15. The non-transitory computer-readable storage medium according to claim 14, wherein the signaling indicates "congested" if the serving cell enters congestion while not in congestion at the time the last RoT measurement was received.

16. The non-transitory computer-readable storage medium according to claim 14, wherein the signaling indicates "not congested" if the serving cell leaves congestion while in congestion at the time the last RoT measurement was received.

17. The non-transitory computer-readable storage medium according to claim 14, wherein the UE transmission power reduction level is determined based on a difference, DeltaRoT, between the measured RoT, $RoT_{measure}$, and a configurable congestion detection threshold, $RoT_{congestion\_threshold}$, such that:

$$DeltaRoT = RoT_{measure} - RoT_{congestion\_threshold}.$$

18. The non-transitory computer-readable storage medium according to claim 17, wherein the UE transmission power reduction level, $P_{reduce}$, is determined according to $$P_{reduce} = \min(\max(0,m), delta_{max}), \text{ if}(m-1) \cdot ROT_{grid} \leq DeltaROT \leq m \cdot ROT_{grid},$$

where
- m is a non-zero integer;
- $ROT_{grid}$ is a predefined parameter giving a quantification precision; and
- $delta_{max}$ is an upper limit of the UE transmission power reduction level.

19. The non-transitory computer-readable storage medium according to claim 15, wherein
- a UE transmission power reduction level is predefined; and
- the E-TFC reselection by the at least one UE is further based on the predefined UE transmission power reduction level.

20. The non-transitory computer-readable storage medium according to claim 14, wherein the E-TFC reselection by the at least one UE is that the at least one UE selects a lower E-TFC than that given by a scheduling grant and a maximum transmission power for the at least one UE.

* * * * *